US009235706B2

(12) United States Patent
Ramabhatta et al.

(10) Patent No.: US 9,235,706 B2
(45) Date of Patent: Jan. 12, 2016

(54) PREVENTING EXECUTION OF TASK SCHEDULED MALWARE (75) Inventors: Anil Ramabhatta, Shimoga (IN); Harinath Vishwanath Ramachetty, Bangalore (IN); Nandi Dharma Kishore, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 422 days.

(21) Appl. No.: 13/310,447

(22) Filed: Dec. 2, 2011

(65) Prior Publication Data

US 2013/0145472 A1 Jun. 6, 2013

(51) Int. Cl.
*G06F 21/56* (2013.01)
*G06F 21/55* (2013.01)
*H04L 29/06* (2006.01)

(52) U.S. Cl.
CPC ............ *G06F 21/566* (2013.01); *G06F 21/554* (2013.01); *G06F 21/56* (2013.01); *H04L 63/145* (2013.01)

(58) Field of Classification Search
CPC ...... G06F 21/56; G06F 21/554; H04L 63/145
USPC ......................................................... 726/25
See application file for complete search history.

(56) References Cited

U.S. PATENT DOCUMENTS

| 7,788,699 | B2 | 8/2010 | Largman et al. | |
| 2006/0294592 | A1* | 12/2006 | Polyakov et al. | 726/24 |
| 2009/0100520 | A1 | 4/2009 | Reasor et al. | |
| 2009/0126016 | A1* | 5/2009 | Sobko et al. | 726/23 |
| 2009/0265756 | A1 | 10/2009 | Zhang et al. | |
| 2009/0271586 | A1 | 10/2009 | Shaath | |
| 2011/0032567 | A1* | 2/2011 | Ishida et al. | 358/1.15 |
| 2012/0124007 | A1* | 5/2012 | Sten et al. | 707/685 |

FOREIGN PATENT DOCUMENTS

| EP | 2 786 295 A1 | 10/2014 |
| WO | 2013082365 A1 | 6/2013 |

OTHER PUBLICATIONS

Roger A. Grimes, Malware loves Windows Task Scheduler, Oct. 25, 2011, infoworld.com, retrieved from http://www.infoworld.com/print/177047 on Feb. 5, 2014.*
Bruce Whitty, Case Study: New Malware Hiding in Task Scheduler, Dec. 19, 2006, Technibble.com, retrieved from http://www.technibble.com/case-study-new-malware-hiding-in-task-scheduler/ on Feb. 4, 2014.*
Trend Micro Threat Encyclopedia, WORM_SOHAND.SM, May 8, 2011, TrendMicro.com, retreived from http://about-threats.trendmicro.com/malware.aspx?language=au&name=WORM_SOHAND.SM on Feb. 4, 2014.*

(Continued)

*Primary Examiner* — Chau Le
*Assistant Examiner* — Gary Lavelle
(74) *Attorney, Agent, or Firm* — Baker Botts L.L.P.

(57) ABSTRACT

A method for preventing malware attacks includes the steps of detecting an attempt on an electronic device to access a task scheduler, determining an entity associated with the attempt to access the task scheduler, determining a malware status of the entity, and, based on the malware status of the entity, allowing or denying the attempted access to the task scheduler. The task scheduler is configured to launch one or more applications at a specified time or interval.

18 Claims, 6 Drawing Sheets

(56) References Cited

OTHER PUBLICATIONS

Drupal, Configuring cron jobs using the cron command, Apr. 19, 2011; drupal.org, pp. 1-6; downloaded from http://web.archive.org/web/20110625115758/http://drupal.org/node/23714 on Apr. 19, 2015.*

International Preliminary Report on Patentability and Written Opinion received for PCT Patent Application No. PCT/US2012/067203, mailed on Jun. 12, 2014, 6 pages.

International Search Report and Written Opinion received for PCT Patent Application No. PCT/US2012/067203, mailed on Jan. 17, 2013, 10 pages.

* cited by examiner

PREVENTING EXECUTION OF TASK SCHEDULED MALWARE

TECHNICAL FIELD OF THE INVENTION

The present invention relates generally to computer security and malware protection and, more particularly, to preventing execution of task scheduled malware.

BACKGROUND

Malware infections on computers and other electronic devices are very intrusive and hard to detect and repair. Anti-malware solutions may require matching a signature of malicious code or files against evaluated software to determine that the software is harmful to a computing system. Malware may disguise itself through the use of polymorphic executables wherein malware changes itself to avoid detection by anti-malware solutions. In such case, anti-malware solutions may fail to detect new or morphed malware in a zero-day attack. Malware may include, but is not limited to, spyware, rootkits, password stealers, spam, sources of phishing attacks, sources of denial-of-service-attacks, viruses, loggers, Trojans, adware, or any other digital content that produces unwanted activity.

SUMMARY

In one embodiment, a method for preventing malware attacks includes the steps of detecting an attempt on an electronic device to access a task scheduler, determining an entity associated with the attempt to access the task scheduler, determining a malware status of the entity, and, based on the malware status of the entity, allowing or denying the attempted access to the task scheduler. The task scheduler is configured to launch one or more applications at a specified time or interval.

In another embodiment, an article of manufacture includes a computer readable medium and computer-executable instructions carried on the computer readable medium. The instructions are readable by a processor. The instructions, when read and executed, cause the processor to detect an attempt on an electronic device to access a task scheduler, determine an entity associated with the attempt to access the task scheduler, determine a malware status of the entity, and, based on the malware status of the entity, allow or deny the attempted access to the task scheduler. The task scheduler configured to launch one or more applications at a specified time or interval.

In yet another embodiment, a system for preventing malware attacks includes a processor coupled to a memory and an anti-malware module executed by the processor. The anti-malware module is resident within the memory and communicatively coupled to a task scheduler on an electronic device. The task scheduler is configured to launch one or more applications at a specified time or interval. The anti-malware module is configured to detect an attempt on the electronic device to access the task scheduler, determine an entity associated with the attempt to access the task scheduler, determine a malware status of the entity, and, based on the malware status of the entity, allow or deny the attempted access to the task scheduler.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
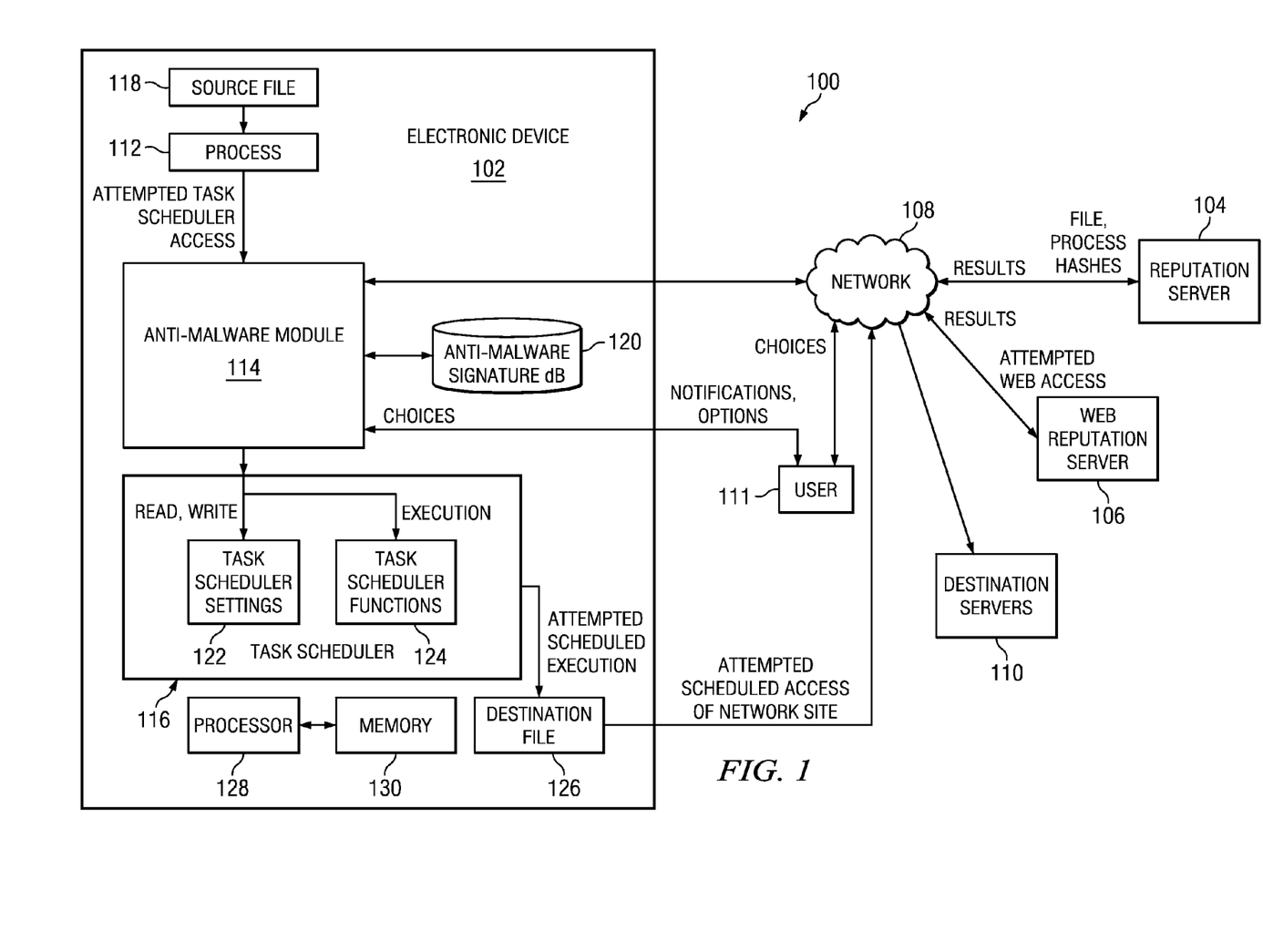
FIG. 1 is an illustration of an example system for preventing execution of task scheduled malware.

FIG. 1 is an illustration of an example system 100 for preventing execution of task scheduled malware. Such malware may be launched by a task scheduler 116 on system 100 or as a result of being scheduled for execution by task scheduler 116. System 100 may include an electronic device 102, an anti-malware module 114, a reputation server 104, a web reputation server 106, destination servers 110, and a user 111. Anti-malware module 114 may be configured to monitor or scan electronic device 102 for malware based on task scheduling. Anti-malware module 114 may be configured to detect attempts to access, modify, or use task scheduler 116 on electronic device 102. Anti-malware module 114 may be communicatively coupled to and configured to communicate with anti-malware signature database 120, reputation server 104, and/or web reputation server 106 to determine whether detected actions related to task scheduler 116 comprise a malware infection. Anti-malware module 114 may be configured to communicate with a user 111 to, for example, provide results or determine corrective actions. Anti-malware module 114 may be configured to carry out one or more corrective actions in response to detection of attempts to access, modify, or use task scheduler 116.

In one embodiment, anti-malware module 114 may be executing on electronic device 102. Anti-malware module 114 may be implemented in an executable, script, library, or any other suitable mechanism. Anti-malware module 114 may be loaded and executed on electronic device 102. Anti-malware module 114 may be communicatively coupled to reputation server 104 and/or web reputation server 106 through network 108, or any other suitable network or communication scheme.

In another embodiment, anti-malware module 114 may be executing on a device separate from electronic device 102. In such an embodiment, anti-malware module 114 may be communicatively coupled to electronic device 102 through a network. Anti-malware module 114 may be configured to operate in a cloud computing scheme, comprising software resident on a network 108. In such an embodiment, anti-malware module 114 may scan electronic device 104 without executing on electronic device 101. Anti-malware module 114 may be communicatively coupled to reputation server 104 and/or web reputation server 106 through network 108. Reputation server 104 and/or web reputation server 106 may comprise a server on network 108.

Anti-malware module 114 may be communicatively coupled to a user 111 of system 100. User 111 may include a human user, a network server configured to administer the operation of electronic device 102, network security settings and preferences, or any other suitable mechanism. In one embodiment, anti-malware module 114 may display results to user 111 and accept selected corrective action. In another embodiment, anti-malware module 114 may be configured to access user 111 to communicate conditions discovered on electronic device 102 and to determine policies or actions to be taken as a result.

Network 108 may include any suitable network, series of networks, or portions thereof for communication between electronic device 104, user 111, monitor 102, reputation server 104, web reputation server 106, or destination servers 110. Such networks may include but are not limited to: the Internet, an intranet, wide-area-networks, local-area-networks, back-haul-networks, peer-to-peer-networks, or any combination thereof.

Electronic device 102 may include any device configurable to interpret and/or execute program instructions and/or process data, including but not limited to: a computer, desktop, server, laptop, personal data assistant, or smartphone. Electronic device 102 may include a processor 128 communicatively coupled to a memory 130.

Processor 128 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 128 may interpret and/or execute program instructions and/or process data stored in memory 130.

Memory 130 may be configured in part or whole as application memory, system memory, or both. Memory 130 may include any system, device, or apparatus configured to hold and/or house one or more memory modules. Each memory module may include any system, device or apparatus configured to retain program instructions and/or data for a period of time (e.g., computer-readable media). Instructions, logic, or data for anti-malware module 114 may reside in memory 130 for execution by processor 128.

Electronic device 102 may include a task scheduler 116 configured to schedule the execution of scripts, applications, executables, processes, or other entities on electronic device 102. For example, task scheduler 116 may be configured to schedule the loading and execution of destination file 126 at a designated time. Task scheduler 116 may be implemented by, for example, a script, application, executable, process, batch file, or other entity on electronic device 102. In one embodiment, task scheduler 116 may be configured to operate without user intervention. Task scheduler 116 may be configured to be launched upon boot or start-up of electronic device 102. In another embodiment, task scheduler 116 may be launched by a user of electronic device 102. In yet another embodiment, task scheduler 116 may be implemented by a Windows™ operating system service.

Task scheduler 116 may include one or more task scheduler settings 122. Task scheduler settings 122 may include settings, files, scripts, or other mechanisms for storing information about a given task that is to be scheduled to be executed. In one embodiment, task scheduler settings 122 may be implemented by one or more job files. In another embodiment, task scheduler settings 122 may be implemented by Windows™.job files. Task scheduler settings 122 may include descriptions of, for a given job, one or more processes, scripts, executables, files, or other entities to be executed as well as when such execution should occur.

Task scheduler 116 may include one or more task scheduler functions 124. Task scheduler functions 124 may include functions provided to, for example, schedule, create, modify, or delete tasks to be scheduled by task scheduler 116. Task scheduler functions 124 may be configured to affect task scheduler settings 122.

A change to task scheduler 116 may constitute a malware attack. Change to task scheduler 116 may cause malware to be launched, installed, or otherwise operated. The malware attack may be scheduled in a manner to evade detection by anti-malware software. For example, execution of destination file 126 may itself be malicious—attacking one or more system resources—or may download malware, spawn malware, or attempt to contact a malicious network destination. Based on task scheduler settings 122, task scheduler 116 may be configured to attempt access of a website, network server, or other networked entity such as destination servers 110. In one embodiment, task scheduler 116 may be configured to make such an attempt through the launch of destination file 126.

Scheduled tasks may be created, modified, or deleted by accessing task scheduler settings 122 directly or by performing such operations on task scheduler settings 122 through operation of task scheduler functions 124. Consequently, anti-malware module 114 may monitor electronic device 102 for attempted access of task scheduler settings 122 directly and through execution of task scheduler functions 124.

Access of task scheduler 114 may be made by, for example, processes or applications running on electronic device 102. Processes or applications accessing task scheduler 116 may be spawned from other processes or files on electronic device 102. For example, loading or execution of source file 118 may cause process 112 to be loaded, which may in turn attempt to access task scheduler 116. Process 112 may attempt to access task scheduler settings 122 directly or may access task scheduler functions 124 to access the task scheduler settings 122.

Anti-malware module 114 may be configured to intercept attempted access to task scheduler 116. Anti-malware module 114 may be configured to intercept the access through any suitable mechanism. For example, anti-malware module 114 may be configured to intercept access by using file system filters on the files storing task scheduler 116 or task scheduler settings 122, hooking task scheduler functions 124, or registering call-back functions upon access to task scheduler 124.

Upon detecting attempted access of task scheduler 116, anti-malware module 114 may be configured to determine whether the access originates from malicious entities or includes malicious modifications. To make such determinations, anti-malware module 114 may take any suitable action such as consulting anti-malware signature database 120, accessing reputation server 104, or accessing web reputation server 106.

To determine whether an attempted access of task scheduler 116 is malicious, upon detection of an attempted access anti-malware module 114 may be configured to analyze an entity that made the attempt—directly or through another file or process—and determine whether the entity is malicious. Anti-malware module 114 may be configured to determine the entity that attempted to access task scheduler 116. For example, process 112 may have attempted to access task scheduler 116. Anti-malware malware module 114 may be configured to determine the source—such as a file or process—that spawned the entity making the attempt. For example, source file 118 may have spawned process 112. Such determinations are made because, while the entity such as process 112 making the attempted access of task scheduler 116 may not be known to be malicious, it may have been used as a mechanism to hide the identity of a malicious source that is the entity ultimately trying to access task scheduler 116. Anti-malware module 114 may be configured to determine whether the entity attempting to access task scheduler 116 is malicious by accessing, for example, anti-malware signature database 120 or reputation server 104.

To determine whether an attempted access of task scheduler 116 is malicious, upon detection of an attempted access anti-malware module 114 may be configured to analyze the effects of the attempted access and determine whether the effect is malicious. Anti-malware module 114 may be configured to determine the task or job that is to be scheduled by the attempted change. In one embodiment, the attempted change to task scheduler 116 may include a designation of an entity such as destination file 126 to be executed at a specified time. While the source of the attempted access may not be known to be malicious, destination file 126 may be known to be associated with malware and thus indicate that the attempt is malicious. Anti-malware module 114 may be configured to determine whether the destination file 126 is malicious by accessing, for example, anti-malware signature database 120 or reputation server 104. In another embodiment, the attempted change to task scheduler 116 may include a command, instruction, parameter, or other indication that a remote server such as a website will be accessed as part of the scheduled task. For example, the attempted access of task scheduler 116 may contain an indication that destination server 110 is to be accessed as part of the scheduled task. While the source or destination files may not be known to be malicious, the destination server 110 may be known to be associated with malware and thus the attempt to access task scheduler 116 may be malicious. Malware may use such a scheme to, for example, hijack trusted applications to download and install other malware. Anti-malware module 114 may be configured to determine whether the destination server 110 associated with the attempt to access task scheduler 116 is malicious by accessing, for example, web reputation server 106.

For entities such as source file 118, process 112, or destination file 126 anti-malware module 114 may be configured to determine a digital signature, digital hash, or other identification of the process or file. Such identification may uniquely identify the process or file. In one embodiment, anti-malware module 114 may access anti-malware signature database 120 to determine whether the process or file is known to be malware. Anti-malware module 114 may use the signature or hash of the process or file to look up the process or file in anti-malware signature database 120. In another embodiment, anti-malware module 114 may access reputation server 104 to determine the malware status of the process or file.

Anti-malware signature database 120 may include rules, logic, or other information designating known malware. Anti-malware signature database may index such known malware by unique identifiers of malicious processes or files. Anti-malware signature database 120 may reside on electronic device 102. Anti-malware signature database 120 may be implemented by a file, record, or any other suitable structure. Local copies of anti-malware signature database 120 may require maintenance and updates as new viruses or other malware are identified and signatures for such malware are transferred to anti-malware signature database 120. The content of anti-malware signature database 120 may not address new malware. Further, anti-malware signature database 120 might lack information reported from other instances of anti-malware modules monitoring other electronic devices. Such information may be necessary to identify how to handle unknown processes or files to prevent zero-day attacks.

Reputation server 104 may be configured to accept requests from clients such as anti-malware module 114 for information about the malware status of a given process or file such as source file 118, process 112, or destination file 110. Reputation server 104 may be configured to mine and record information regarding processes or files from a wide variety of clients located in many different locations. Reputation server 104 may include or be communicatively coupled to a reputation database which may include information regarding processes or files, including whether the process or file is known to be malware, known to be safe, or unknown with regards to malware status. Reputation databases may index such information according to, for example, digital hash or signature. Reputation databases may include counters for determining how often a process or file has been reported. Reputation databases may be implemented in any suitable mechanism such as a file, record, database, or any combination thereof.

A given file or process may be determined by reputation sever 104 to be safe based on research by anti-malware researchers, number and distribution of reported instances, association with known safe websites or other files, or other suitable criteria. A given file or process may be determined in reputation sever 104 to be unsafe based on research by anti-malware researchers, number and distribution of reported instances, association with known malicious websites or behavior, or other suitable criteria. A given file or process may be determined by reputation sever 104 as having an unknown malware status if not enough information exists with respect to its malware status. Unknown entries in reputation sever 104 may be added when reported from clients such as anti-malware module 114 for the first time.

Web reputation server 106 may be configured to accept requests from clients such as anti-malware module 114 for information about the malware status of a given server, website, domain, online file, or other networked entity, such as destination servers 110. Web reputation server 106 may be configured to mine and record information regarding networked entities from a wide variety of clients located in many different locations. Web reputation server 106 may include or be communicatively coupled to a web reputation database which may include information regarding specific servers, sites, files, domains, or other entities, including whether the entity is known to be malware, known to be safe, or unknown with regards to malware status. Web reputation databases may include counters for determining how often interaction with a particular networked entity has been reported. Web reputation databases may be implemented in any suitable mechanism such as a file, record, database, or any combination thereof.

A networked entity may be determined by web reputation sever 106 to be safe based on research by anti-malware researchers, number and distribution of reported interactions, association with known safe processes, websites, or files, or other suitable criteria. A given networked entity may be determined by web reputation sever 106 to be unsafe based on research by anti-malware researchers, number and distribution of reported instances, association with known malicious files, processes, websites or behavior, or other suitable criteria. A networked entity may be determined by web reputation sever 106 as having an unknown malware status if not enough information exists with respect to its malware status. Unknown entries in web reputation sever 106 be may added when reported from clients such as anti-malware module 114 for the first time.

The reputation of an entity in reputation database 104 or web reputation database 106 may be based on how many instances of the entity or interactions with the entity have been reported by various anti-malware modules and across what geographical areas it has been reported. For example, a process, file, or destination server that has never before encountered may be determined to be unknown. A process, file, or destination server may be reported with a wide distribution in a short time—such as a new printer driver deployed as part of a new release or a new file on a destination server available for download. Such a process, file, or website may be determined to be safe. A process, file, or website with only a few reported instances, or one associated with known malicious websites may be determined to be malicious. From the time the reputation server 104 or web reputation server 106 first encounters a new process, file, or website, the entity may thus be designated unknown, but based on additional information over time the entity may be redesignated as safe or unsafe.

Anti-malware module 114 may be configured to receive the malware status from reputation server 104 or web reputation server of the process, file, or website under examination. Based on its analysis or the information, anti-malware module 114 may be configured to perform any suitable action with respect to the attempted access of task scheduler 116. Anti-malware module 114 may be configured to allow the attempted access, deny the attempted access, send additional information to reputation server 104 or web reputation server 106, prompt user 111 for input, clean a process or file from electronic device 102, or take any other suitable action.

Figure 2:
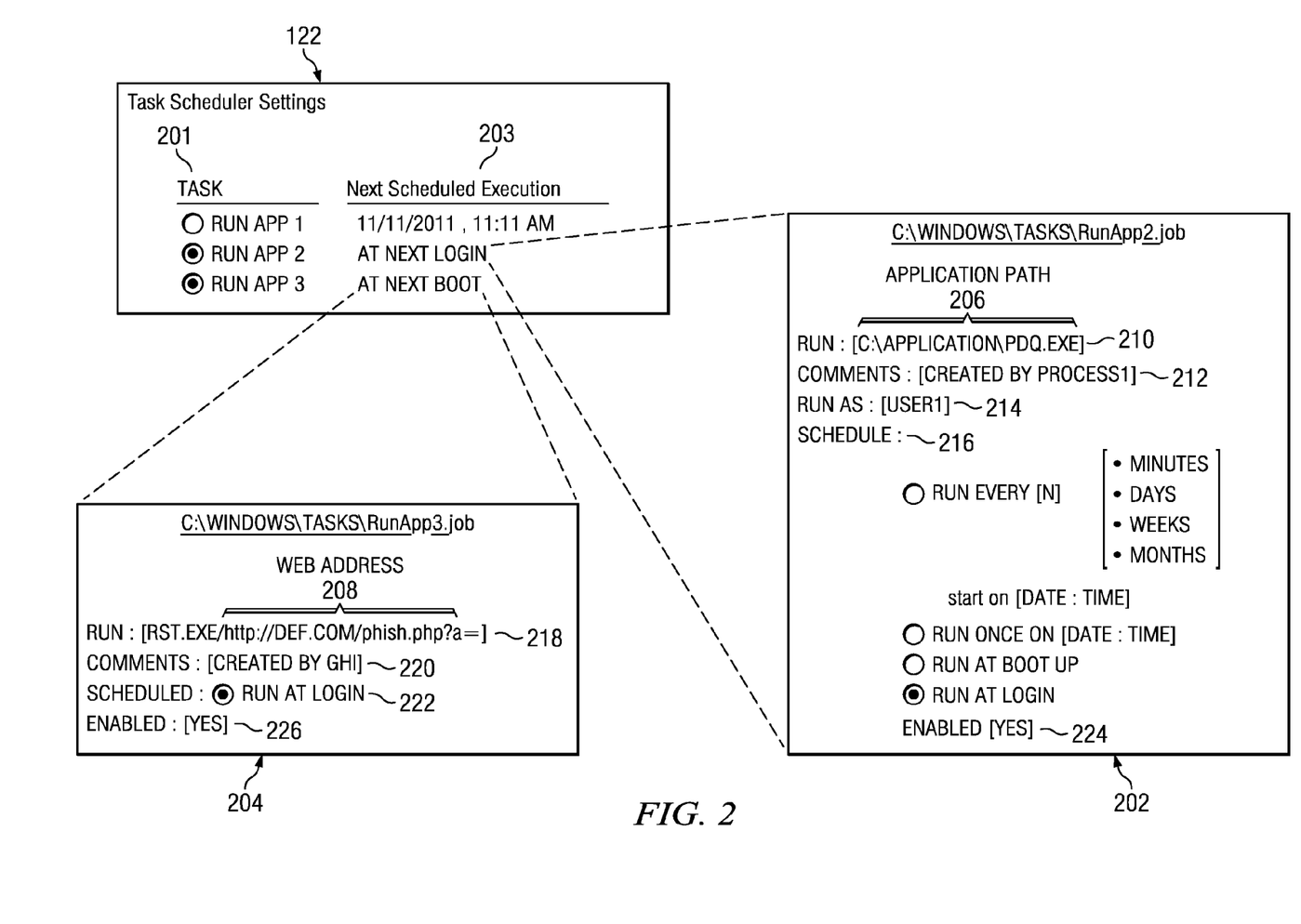
FIG. 2 is an illustration of task scheduler settings configured to execute jobs at specified times or intervals.

FIG. 2 is an illustration of task scheduler settings 122 configured to execute jobs at specified times or intervals. The task scheduler settings 122 shown in FIG. 2 may reflect the kind of information that malware may attempt to add to task scheduler 116. Task scheduler settings 122 may include one or more job files indexed by a task name 201 wherein each is configured to execute at a next-scheduled-execution 203. For example, task scheduler settings 122 may include jobs titled RunApp1 scheduled to execute next at Nov. 11, 2011 at 11:11 AM; RunApp2 scheduled to execute at the next login; and RunApp3 scheduled to execute at the next boot-up.

RunApp2 job file 202 may include an execution designation 210 configured to indicate or allow access to designate the entities to be executed. Execution designation 210 may include an application path 206 indicating a particular executable, file, script, or other entity to be executed. If task scheduler 116 is accessed to add or modify RunApp2 job file 202, execution designation 210 and/or application path 206 may indicate the identity of destination file 126. For example, RunApp2 job file 202 may indicate that a file corresponding to "c:\application\pdq.exe" is to be executed.

RunApp2 job file 202 may include comments 212 configured to indicate the user, process, or other entity that created the job file. For example, comments 212 may indicate that RunApp2 job file 202 was created by "Process1."

RunApp2 job file 202 may include an execution profile 214 configured to indicate or allow access to the user, profile, or account under which the job will be executed. Different such users, profiles, or accounts may have different execution privileges. For example, execution profile 214 may indicate that RunApp2 job file will be executed under the user profile for "User1."

RunApp2 job file 202 may include a schedule 216 configured to indicate or allow access to designate when the task should be executed. For example, schedule 216 may include options to run every "N" minutes, days, weeks, or months, wherein "N" is a selectable integer, beginning on a selectable date and time. Schedule 216 may include an option to run once at a selectable date and time. Scheduler 216 may include an option to run at boot-up or an option to run at login.

RunApp2 job file 202 may include an enablement option 224 configured to enable execution of the task. Thus, a job file may be stored in task scheduler settings 122 without being enabled, and may be enabled at a later date.

RunApp3 job file 204 may include an execution designation 218 configured similarly to execution designation 210. Execution designation 218 may include a web address 208 used a parameter to be passed to the entity which is executed. Such a web address 208 may be used to provide instruction to, for example, destination file 126. Web address 208 may be an indication of a destination server 110 which is to be contacted by destination file 126. For example, RunApp3 job file 204 may include an execution designation 218 which may indicate that "rst.exe" will be executed and passed the web address 208 of "http://def.com/phish.php?a=".

RunApp3 job file 204 may include comments 220 indicating that the job file was created by GHI, schedule 222 indicating that the job file will be executed at next login, and enablement option 224 indicating that the job file is enabled.

Upon detecting attempted access to task scheduler 116, anti-malware module 114 may be configured to determine information to be placed into job files such as RunApp2 job file 202 and RunApp3 job file 204. Such information may include the application path 206 of the destination file 126 or the web address 208 of a destination server 110 to be contacted. Anti-malware module 114 may determine the malware status of a destination file 126 or destination server 110 based on such information.

Figure 3:
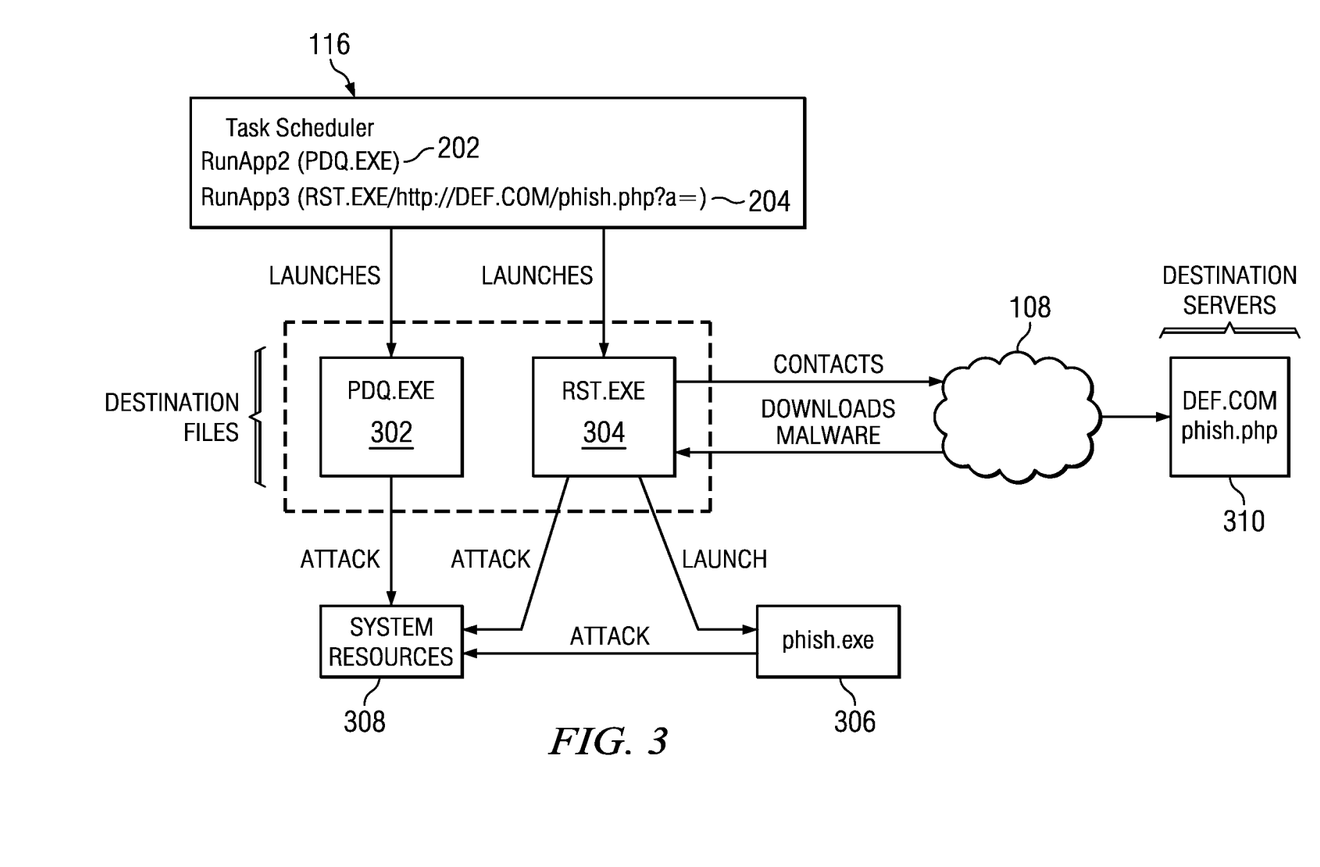
FIG. 3 is an illustration of example operation of malware operating by accessing a task scheduler.

FIG. 3 is an illustration of example operation of malware operating by accessing task scheduler 116. Task scheduler 116 may have tasks as shown in FIG. 2 for RunApp2 job file 202 and RunApp3 job file 204, added for the execution of "pdq.exe" and "rst.exe/http:/def.com/phish.php?a=".

Execution of RunApp2 job file 202 may lead to the launch and execution of pdq.exe 302. Pdq.exe 302 may be operating as a destination file 126 as shown in FIG. 1. Pdq.exe 302 may attack various system resources 308, such as system memory, operating system settings, user input (through keyloggers), or conduct other behavior associated with malware.

Execution of RunApp3 job file 204 may lead to the launch and execution of rst.exe 304. Rst.exe 304 may be operating as a destination file 126 as shown in FIG. 1. Rst.exe 304 may be configured to contact a remote network entity 310 with the address "http://def.com/phish.php?a=" over network 108. Such a network entity 310 may be operating as a destination server 110 as shown in FIG. 1. Rst.exe 304 may download malware from network entity 310. Such malware may affect the operation of rst.exe 304 such that rst.exe attacks system resources 308, or may cause rst.exe to launch an additional entity such as phish.exe 306 that may attack system resources 308.

Anti-malware module 114 may thus be configured to determine changes to task scheduler 116 configured to execute a local entity as well as access a remote network location.

In operation, anti-malware module 114 may be operating to protect electronic device 102 from malicious modifications to task scheduler 116 that may cause task-scheduled malware. In one embodiment, anti-malware module 114 may be executing on electronic device 102. In another embodiment, anti-malware module 114 may be communicating with electronic device 102 to protect it from such modifications.

Anti-malware module 114 may intercept or detect attempted access to any suitable portion of a task scheduler 116 of electronic device, such as access to task scheduler settings 122 or task scheduler 124. For example, process 112 may attempt to access task scheduler 116 and may be detected by anti-malware module 114. Anti-malware module 114 may determine one or more sources of the process, such as source file 118. Anti-malware module 114 may determine whether an attempted access of task scheduler 116 includes an attempted scheduled execution of a destination file 126 or an access of a destination server 110. Anti-malware module 114 may determine whether a digital hash, signature, or other identifier for any such file or process. Anti-malware module 114 may determine whether any such file or process is listed as malware in anti-malware signature database 120. Anti-malware module 114 may determine whether reputation server 104 has designated the file or process as safe, malicious, or unknown as to malware status. Anti-malware module 114 may determine whether web reputation server 106 has designated the destination server as safe, malicious, or unknown as to malware status.

Based on its determinations, anti-malware module 114 may determine how to handle the attempted access of scheduler 116. Determinations of how to handle attempted access of scheduler 116 may be made by, for example, rules or from input from user 111. Rules on how to handle the attempted access may, for example, be set within anti-malware module 114, received from reputation server 104, or stored and accessed in configuration files or settings on user 111. Anti-malware module 114 may alert user 111 of malware determinations and may prompt user 111 for input regarding how to proceed based on such determinations.

In one embodiment, if none of the source file 118, process 112, destination file 126, or destination server 110 are determined to be malicious, anti-malware module 114 may allow the access. Anti-malware module 114 may communicate the result to user 111 and indicate that the access will be allowed.

In another embodiment, if any of the source file 118, process 112, destination file 126, or destination server 110 is determined to be malicious, anti-malware module 114 may deny the access. Anti-malware module 114 may communicate the result to user 111 and indicate that the access will not be allowed.

In yet another embodiment, if any of the source file 118, process 112, destination file 126, or destination server 110 is determined to be unknown, anti-malware module 114 may treat the attempted access as suspicious. Suspicious access may be handled according to settings provided by user 111, reputation server 104, or anti-malware module 114. In some cases, by default, suspicious access may be assumed to be malicious and thus anti-malware module 114 may deny access. This may be a very aggressive approach to preventing task-scheduled malware. False positives—wherein a legitimate entity is mistakenly determined to be malware—may occur with such an approach. In some cases, by default, suspicious access may be assumed to be safe and thus anti-malware module 114 may allow access. This may be a very permissive approach to preventing task-scheduled malware. Infected entities may be allowed to operate with such an approach. In some cases, by default, user 111 may be accessed to determine how to handle unknown or suspicious attempted access.

Figure 4:
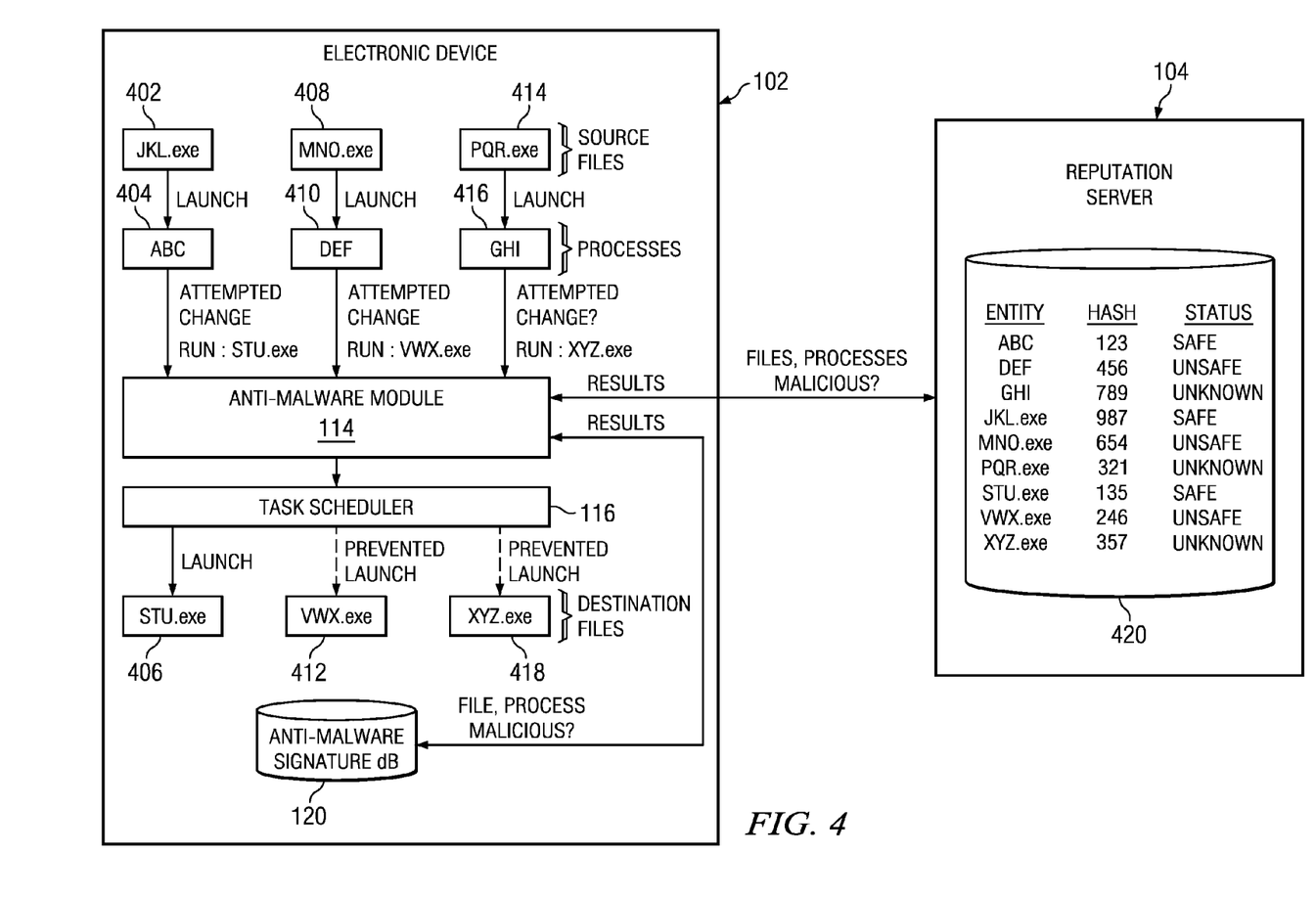
FIG. 4 is an illustration of example operation of a system to prevent malicious attempts to access a task scheduler.

FIG. 4 is an illustration of example operation of system 100 to prevent malicious attempts to access task scheduler 116. Anti-malware module 114 may intercept attempted access of task scheduler 116. Anti-malware module 114 may determine whether the source file, process, or destination file associated with the attempt are malicious and take any necessary corrective action. Anti-malware module 114 may access, for example, anti-malware signature database 120 or reputation server 104 to make such a determination. Reputation server 104 may include a reputation database 420 containing designations of a given file or process and a determination of the entity's malware status.

For example, a source file such as jkl.exe 402 may launch a process such as ABC 404, which may attempt to access task scheduler 116. The attempted access may include an attempt to cause task scheduler to run a destination file such as stu.exe 406. Anti-malware module 114 may determine an identifier, hash, or signature of process ABC 404. Anti-malware module 114 may determine whether ABC 404 is listed as malicious in anti-malware signature database 120. If so, then the attempt may be determined to be malicious. If not, or if anti-malware signature database 120 does not have information regarding ABC 404 then anti-malware module 114 may determine the status of ABC 404 according to reputation server 104. Reputation server 104 may determine from reputation database 420 that ABC 404 is known to be safe.

Reputation server 104 may determine that the source of ABC 404 is jkl.exe 402. Anti-malware module 114 may determine an identifier, hash, or signature of jkl.exe 402. Anti-malware module 114 may determine whether jkl.exe 402 is listed as malicious in anti-malware signature database 120. If so, then the attempt may be determined to be malicious. If not, then anti-malware module 114 may determine the status of jkl.exe 402 according to reputation server 104. Reputation server 104 may determine from reputation database 420 that jkl.exe 402 is known to be safe.

Reputation server 104 may determine that the attempt to access task scheduler 116 includes an attempt to schedule stu.exe 406 for execution. Anti-malware module 114 may determine an identifier, hash, or signature of stu.exe 406. Anti-malware module 114 may determine whether stu.exe 406 is listed as malicious in anti-malware signature database 120. If so, then the attempt may be determined to be malicious. If not, then anti-malware module 114 may determine the status of stu.exe 406 according to reputation server 104. Reputation server 104 may determine from reputation database 420 that stu.exe 406 is known to be safe.

Consequently, because jkl.exe 402, ABC 404, and stu.exe 406 have been determined to be safe, anti-malware module 114 may allow the attempted access of task scheduler 116. Task scheduler 116 may, at the designated time, launch the execution of stu.exe 406.

In another example, a source file such as mno.exe 408 may launch a process such as DEF 410, which may attempt to access task scheduler 116. The attempted access may include an attempt to cause task scheduler to run a destination file such as vwx.exe 412. Anti-malware module 114 may determine an identifier, hash, or signature of mno.exe 408, DEF 410, or vwx.exe 412. Anti-malware module 114 may determine whether any of mno.exe 408, DEF 410, and vwx.exe 412 is listed as malicious in anti-malware signature database 120. If so, then the attempt may be determined to be malicious. If not, or if anti-malware signature database 120 does not have relevant information then anti-malware module 114 may determine the status of mno.exe 408, DEF 410, and vwx.exe 412 according to reputation server 104. Reputation server 104 may determine from reputation database 420 that mno.exe 408, DEF 410, or vwx.exe 412 are known to be unsafe.

Consequently, because mno.exe 408, DEF 410, or vwx.exe 412 have been determined to be unsafe, anti-malware module 114 may determine that the attempted access constitutes a malware attack and deny the attempted access of task scheduler 116. The launch of vwx.exe 412 may be prevented. Anti-malware module 114 may take action on mno.exe 408 and/or DEF 410 such as removing the process or file, cleaning the process or file, repairing the process or file, or placing the process or file into a sandbox for execution. Anti-malware module 114 may undo, remove, or clean any task files or other portions of task scheduler 116. One or more of such corrective actions may be taken after prompting user 111.

In yet another example, a source file such as pqr.exe 414 may launch a process such as GHI 416, which may attempt to access task scheduler 116. The attempted access may include an attempt to cause task scheduler to run a destination file such as xyz.exe 418. Anti-malware module 114 may determine an identifier, hash, or signature of pqr.exe 414, GHI 416, or xyz.exe 418. Anti-malware module 114 may determine whether any of pqr.exe 414, GHI 416, or xyz.exe 418 is listed as malicious in anti-malware signature database 120. If so, then the attempt may be determined to be malicious. If not, or if anti-malware signature database 120 does not have relevant information then anti-malware module 114 may determine the status of pqr.exe 414, GHI 416, or xyz.exe 418 according to reputation server 104. Reputation server 104 may determine from reputation database 420 that the malware status of pqr.exe 414, GHI 416, or xyz.exe 418 is unknown.

If the malware status of pqr.exe 414, GHI 416, or xyz.exe 418 is determined to be unknown, then anti-malware module 114 may determine that the attempted access is suspicious. In one embodiment, anti-malware module 114 may determine that the attempted access is suspicious if one or more of pqr.exe 414, GHI 416, or xyz.exe 418 is determined to be unknown and the others are determined to be safe.

In another embodiment, anti-malware module 114 may prompt user 111 for instructions on how to handle attempted access from entities whose malware status is unknown. Anti-malware module 114 may prompt user 111 for instructions on whether to allow or deny such access. Anti-malware module 114 may prompt user 111 to choose whether to clean, delete, repair, or quarantine pqr.exe 414, GHI 416, or xyz.exe 418 if such access is denied.

In yet another embodiment, anti-malware module 114 may assume that the attempt is safe if at least one of pqr.exe 414, GHI 416, or xyz.exe 418 is known to be safe. Anti-malware module 114 may allow the execution of xyz.exe 418. Such an assumption may lead to malware, whose malicious status is not known and is present in one or more of pqr.exe 414, GHI 416, or xyz.exe 418, to infect electronic device 102.

In still yet another embodiment, anti-malware module 114 may assume that the attempt is unsafe if each of pqr.exe 414, GHI 416, and xyz.exe 418 is determined to be unknown. Anti-malware module 114 may deny the execution of xyz.exe 418. Such an assumption may lead to false positives wherein pqr.exe 414, GHI 416, and xyz.exe 418 are safe yet their status is not known.

Figure 5:
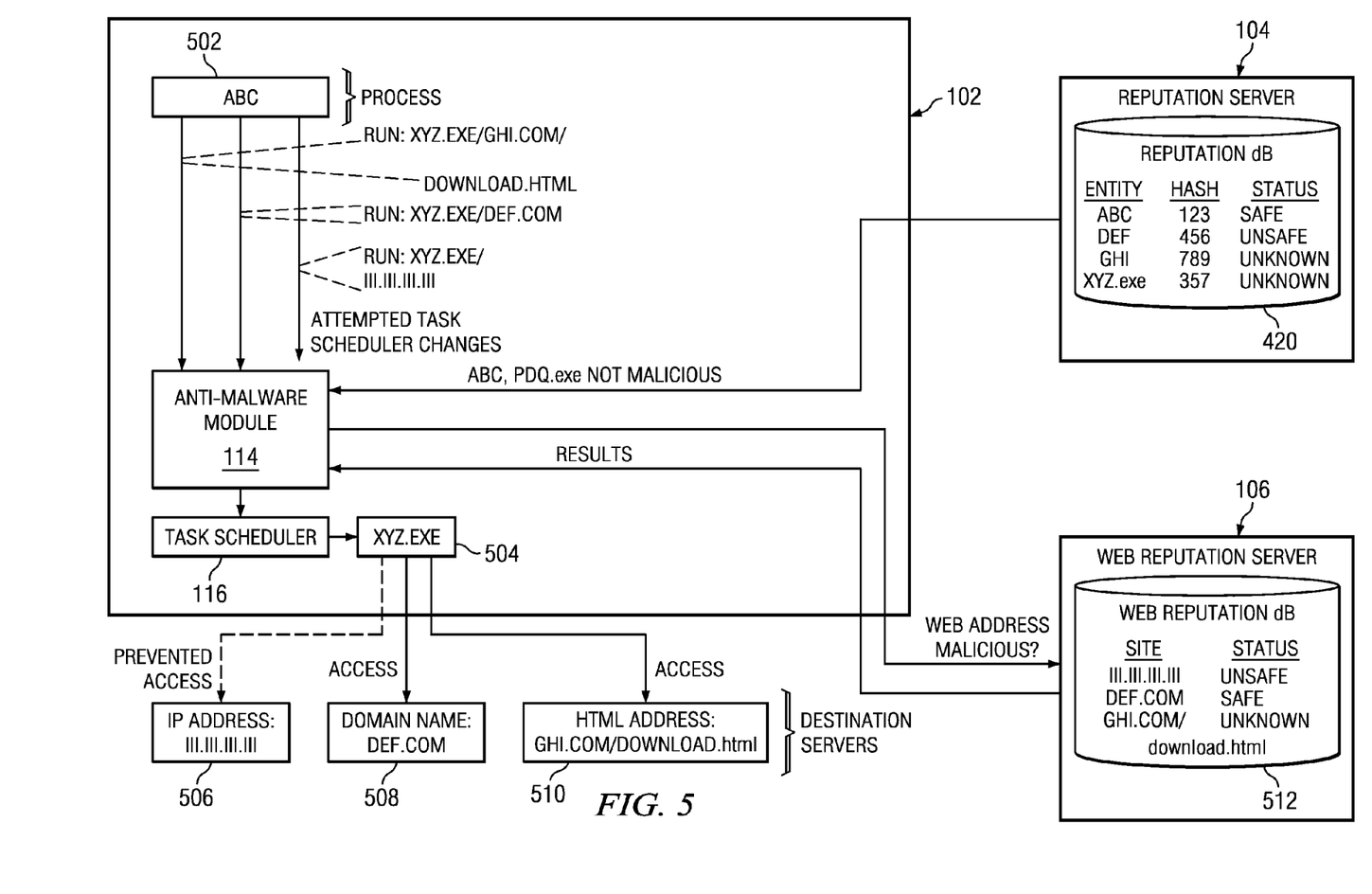
FIG. 5 is a further illustration of example operation of a system to prevent malicious attempts to access a task scheduler.

FIG. 5 is a further illustration of example operation of system 100 to prevent malicious attempts to access task scheduler 116. Anti-malware module 114 may intercept attempted access of task scheduler 116. Anti-malware module 114 may determine whether the destination server associated with the attempt is malicious and take any necessary corrective action. Anti-malware module 114 may access, for example, web reputation server 106 to make such a determination. Web reputation server 106 may include a web reputation database 512 containing designations of a web destination and a determination of the associated malware status. Web reputation database 512 may index malware status information in any suitable manner, include by Internet Protocol ("IP") address, domain name, or specific subdivisions or content on such a destination server.

For example, a process ABC 502 may attempt to access task scheduler 116 to run a task including execution of "xyz.exe/111.111.111.111". Anti-malware module 114 may determine that process ABC 502, destination file xyz.exe 504, and any associated source file are safe or have a malware status of unknown. Anti-malware module 114 may determine that the attempted access of destination file xyz.exe 504 includes an attempted contact to the destination server identified by "111.111.111.111" 506. Anti-malware module 114 may access web reputation server 106 to determine the reputation of "111.111.111.111" 506. Web reputation server 106 may determine from web reputation database 512 that "111.111.111.111" 506 is known to be unsafe or malicious.

Consequently, because "111.111.111.111" 506 has been determined to be unsafe, anti-malware module 114 may determine that the attempted access constitutes a malware attack and deny the attempted access of task scheduler 116. The launch of xyz.exe 504 may be prevented. Anti-malware module 114 may take action on ABC 502 or the entity launching ABC 502 such as removing the process or file, cleaning the process or file, repairing the process or file, or placing the process or file into a sandbox for execution. Anti-malware module 114 may undo, remove, or clean any task files or other portions of task scheduler 116. One or more of such corrective actions may be taken after prompting user 111. Access to "111.111.111.111" 506 may be prevented.

In another example, a process ABC 502 may attempt to access task scheduler 116 to run a task including execution of "xyz.exe/def.com". Anti-malware module 114 may determine that process ABC 502, destination file xyz.exe 504, and any associated source file are safe or have a malware status of unknown. Anti-malware module 114 may determine that the attempted access of destination file xyz.exe 504 includes an attempted contact to the destination server identified by def.com 508. Anti-malware module 114 may access web reputation server 106 to determine the reputation of def.com 508. Web reputation server 106 may determine from web reputation database 512 that def.com 508 is known to be safe.

Consequently, because def.com 508 is known to be safe, anti-malware module 114 may allow the attempted access of task scheduler 116. Task scheduler 116 may, at the designated time, launch the execution of xyz.exe 504. Access may be made to def.com 508.

In yet another example, a process ABC 502 may attempt to access task scheduler 116 to run a task including execution of "xyz.exe/ghi.com/download.html". Anti-malware module 114 may determine that process ABC 502, destination file xyz.exe 504, and any associated source file are safe or have a malware status of unknown. Anti-malware module 114 may determine that the attempted access of destination file xyz.exe 504 includes an attempted contact to the destination server identified by ghi.com/download.html 510. Anti-malware module 114 may access web reputation server 106 to determine the reputation of ghi.com/download.html. Web reputation server 106 may determine from web reputation database 512 that ghi.com/download.html 510 has an unknown malware status.

If the malware status of ghi.com/download.html 510 is determined to be unknown, then anti-malware module 114 may determine that the attempted access is suspicious. In one embodiment, anti-malware module 114 may determine that the attempted access is suspicious if one or more of ghi.com/download.html 510, the process, source file, or destination file is determined to be unknown and the others are determined to be safe.

In another embodiment, anti-malware module 114 may prompt user 111 for instructions on how to handle attempted access in which contact will be made with destination servers whose malware status is unknown. Anti-malware module 114 may prompt user 111 for instructions on whether to allow or deny such access. Anti-malware module 114 may prompt user 111 to choose whether to clean, delete, repair, or quarantine source files, destination files, or processes if such access is denied.

In yet another embodiment, anti-malware module 114 may assume that the attempt is safe if at least one of the source files, processes, or destination files is known to be safe, even though the malware status of destination server ghi.com/download.html 510 is unknown. Anti-malware module 114 may allow the execution of xyz.exe 504. Such an assumption may lead to malware, whose malicious status is not known and is present in one or more of the source file, process, or destination file.

In still yet another embodiment, anti-malware module 114 may assume that the attempt is unsafe if each of ghi.com/download.html 510 and the source file, process, and destination file is determined to be unknown. Anti-malware module 114 may deny the execution of xyz.exe 504. Such an assumption may lead to false positives wherein the source file, process, and destination file are safe yet their status is not known.

Figure 6:
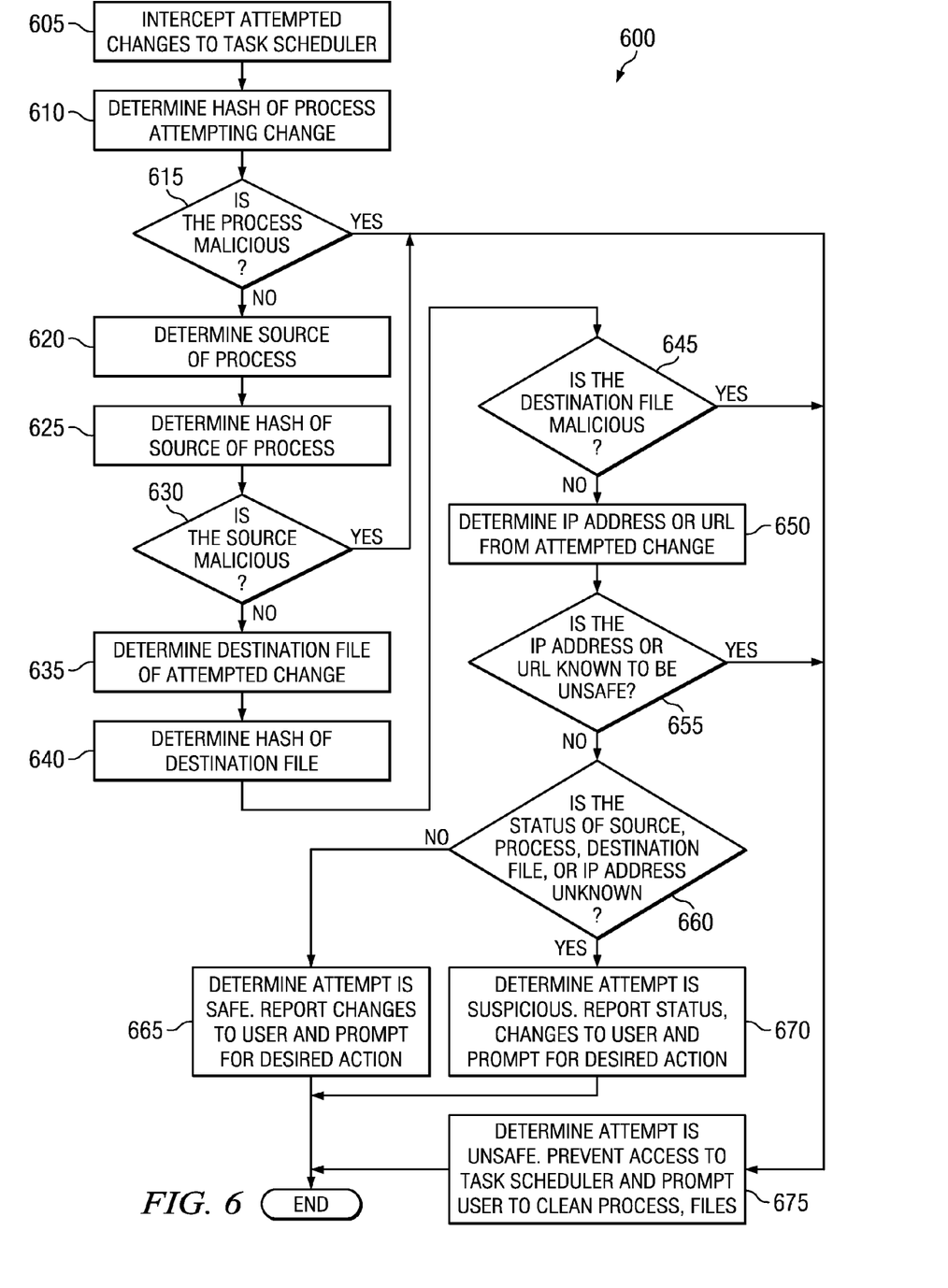
FIG. 6 is an example embodiment of a method for preventing execution of task scheduled malware.

FIG. 6 is an example embodiment of a method 600 for preventing execution of task scheduled malware.

In step 605, an attempted change to a task scheduler of an electronic device may be intercepted or detected. Such a change may be made to, for example, job files, task scheduler settings, or using task scheduler functions.

In step 610, a process on the electronic device that is attempting to make the change may be determined. A hash, digital signature, or other identifier of the process may be determined. In step 615, it may be determined whether the identifier represents a process known to be malicious, unsafe, or otherwise associated with malware. Such a determination may be made by, for example, consulting a local anti-malware signature database or a reputation server. If the process is known to be malicious, then method 600 may proceed to step 675.

If the process is not known to be malicious, then in step 620 a source of the process making the attempted change to the task scheduler may be determined. Such a source may include a source file or a source process. In step 625, a hash, digital signature, or other identifier of the source may be determined. In step 630, it may be determined whether the identifier represents a source known to be malicious, unsafe, or otherwise associated with malware. Such a determination may be made by, for example, consulting a local anti-malware signature database or a reputation server. If the source is known to be malicious, then method 600 may proceed to step 675. Steps 620-630 may be optionally repeated for the source's source, and so on to determine whether any portion of the hierarchy of files or processes that yielded the attempt to access the task scheduler are associated with malware.

If the process is not known to be malicious, then in step 635 the effects of the attempted change may be analyzed. For example, the file path of the task or job to be added to the task scheduler may be analyzed and a destination file to be executed by the task scheduler may be determined. In step 650, a hash, digital signature, or other identifier of the destination file may be determined. In step 655, it may be determined whether the identifier represents a source known to be malicious, unsafe, or otherwise associated with malware. Such a determination may be made by, for example, consulting a local anti-malware signature database or a reputation server. If the destination file is known to be malicious, then method 600 may proceed to step 675.

If the destination file is not known to be malicious, then in step 650 other effects of the attempted change may be analyzed. For example, the file path of the task or job to be added to the task scheduler may be analyzed and an IP address or universal resource locator ("URL") to be accessed by the scheduled task may be determined. In step 655, it may be determined whether the IP address or URL represents a network destination known to be malicious, unsafe, or otherwise associated with malware. Such a determination may be made by, for example, consulting a local blacklist or a web reputation server. If the network destination is known to be malicious, then method 600 may proceed to step 675.

If the network destination is not known to be malicious, then in step 660, it may be determined whether the malware status of any of the source, process, destination file, IP address or URL. If not, then the method 600 may proceed to step 665. If so, then the method 600 may proceed to step 670.

In step 660, it may be determined that the attempted access of the task scheduler is safe. The results of analyzing the source, process, destination file, or IP address may be presented to a user. The attempt may be recorded. The user may be prompted for appropriate action. In one embodiment, the attempt may be allowed by default.

In step 665, it may be determined that the attempted access of the task scheduler involved entities whose malware status is unknown. The results of analyzing the source, process, destination file, or IP address may be presented to a user. The attempt may be recorded. The user may be prompted for appropriate action. In one embodiment, the attempt may be treated as safe by default. In another embodiment, the attempt may be treated as malicious by default. The results of the attempt and the analysis may be reported to a reputation server for further analysis.

In step 670, it may be determined that the attempted access of the task scheduler is unsafe, malicious, or otherwise associated with malware. The results of analyzing the source, process, destination file, or IP address may be presented to a user. The attempt may be recorded. The attempted access of the task scheduler may be prevented. The source, destination file, and process may be cleaned, removed, repaired, or quarantined, or any other suitable corrective action may be taken. In one embodiment, by default the specific portion identified as malicious—i.e. the source, process, destination file, or IP address—may be blocked or cleaned, and the other such portions identified to the user for corrective action.

Method 600 may be implemented using the system of FIGS. 1-2 and 4-5, or any other system operable to implement method 600. As such, the preferred initialization point for method 600 and the order of the steps comprising method 600 may depend on the implementation chosen. In some embodiments, some steps may be optionally omitted, repeated, or combined. In certain embodiments, method 600 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A method for preventing malware attacks, comprising the steps of:
   detecting an attempt on a target electronic device to access a task scheduler, including determining a portion of information to be added to a task scheduler job, the task scheduler job configured to launch one or more applications at a specified date and time with a monitor;
   determining an entity associated with the attempt to access the task scheduler with the monitor based upon the portion of information to be added to the task scheduler job, including determining a network destination to be accessed as a result of adding the portion of information to the task scheduler job;
   determining a malware status of the entity with the monitor, including determining the malware status of the network destination and based upon changes to the task scheduler job in the portion of information to be added to the task scheduler; and
   based on the malware status of the entity, allowing or denying the attempted access to the task scheduler with the monitor;
   wherein the monitor includes an electronic device including a processor communicatively coupled to a memory.

2. The method of claim 1, wherein:
   determining the entity associated with the attempt includes determining a process attempting to access the task scheduler; and
   determining the malware status of the entity includes determining the malware status of the process.

3. The method of claim 1, wherein:
   determining the entity associated with the attempt includes determining a source of a process attempting to access the task scheduler; and
   determining the malware status of the entity includes determining the malware status of the source.

4. The method of claim 1, wherein:
   determining the entity associated with the attempt includes determining a destination file to be launched as a result of the attempt to access the task scheduler; and
   determining the malware status of the entity includes determining the malware status of the destination file.

5. The method of claim 1, wherein:
   determining the entity associated with the attempt includes:
      determining two or more of a process attempting to access the task scheduler, a source of the process attempting to access the task scheduler, a destination file to be launched as a result of the attempt to access the task scheduler, and a network destination to be accessed as a result of the attempt to access the task scheduler;
      determining a relationship between two or more of the process, the source, the destination file, and the network destination; and
   determining the malware status of the entity includes independently determining the malware status of two or more of the process, the source, the destination file, and the network destination.

6. The method of claim 5, further comprising:
   determining, with the monitor, that the malware status of one or more of the process, the source, the destination file, and the network destination is not malicious; and
   denying the attempted access to the task scheduler with the monitor.

7. The method of claim 1, wherein:
   the task scheduler job is further configured to launch one or more applications under a specified user profile;
   the portion of information to the task scheduler job to be added includes a designation of the specified user profile; and
   determining the malware status of the entity includes further determining the malware status of the network destination based upon the designation of the specified user profile.

8. An article of manufacture, comprising:
   a non-transitory computer readable medium; and
   computer-executable instructions carried on the non-transitory computer readable medium, the instructions readable by a processor, the instructions, when read and executed, for causing the processor to:
      detect an attempt on an electronic device to access a task scheduler, including determining a portion of information to be added to a task scheduler job, the task scheduler job configured to launch one or more applications at a specified date and time;
      determine an entity associated with the attempt to access the task scheduler based upon the portion of information to be added to the task scheduler job by determining a network destination to be accessed as a result of adding the portion of information to the task scheduler job;
      determine a malware status of the entity by determining the malware status of the network destination and based upon changes to the task scheduler job in the portion of information to be added to the task scheduler;
      based on the malware status of the entity, allow or deny the attempted access to the task scheduler.

9. The article of claim 8, wherein:
   determining the entity associated with the attempt includes determining a process attempting to access the task scheduler; and
   determining the malware status of the entity includes determining the malware status of the process.

10. The article of claim 8, wherein:
    determining the entity associated with the attempt includes determining a source of a process attempting to access the task scheduler; and
    determining the malware status of the entity includes determining the malware status of the source.

11. The article of claim 8, wherein:
    determining the entity associated with the attempt includes determining a destination file to be launched as a result of the attempt to access the task scheduler; and
    determining the malware status of the entity includes determining the malware status of the destination file.

12. The article of claim 8, wherein:
    determining the entity associated with the attempt includes:
       determining two or more of a process attempting to access the task scheduler, a source of the process attempting to access the task scheduler, a destination file to be launched as a result of the attempt to access the task scheduler, and a network destination to be accessed as a result of the attempt to access the task scheduler; and
       determining a relationship between two or more of the process, the source, the destination file, and the network destination;

determining the malware status of the entity includes independently determining the malware status of two or more of the process, the source, the destination file, and the network destination.

13. The article of claim 12, wherein the processor is caused to:
   determine that the malware status of one or more of the process, the source, the destination file, and the network destination is not malicious; and
   deny the attempted access to the task scheduler.

14. A system for preventing malware attacks, comprising:
   a processor coupled to a memory; and
   an anti-malware module executed by the processor, resident within the memory, and communicatively coupled to a task scheduler on an electronic device, the task scheduler including one or more task scheduler jobs configured to launch one or more applications at a specified date and time;
   the anti-malware module configured to:
      detect an attempt on the electronic device to access the task scheduler by determining a portion of information to be added to a task scheduler job;
      determine an entity associated with the attempt to access the task scheduler based upon the portion of information to be added to the task scheduler job by determining a network destination to be accessed as a result of the attempt to access the task scheduler;
      determine a malware status of the entity by determining the malware status of the network destination and based upon changes to the task scheduler job in the portion of information to be added to the task scheduler;
      based on the malware status of the entity, allow or deny the attempted access to the task scheduler.

15. The system of claim 14, wherein:
   determining the entity associated with the attempt includes determining a process attempting to access the task scheduler; and
   determining the malware status of the entity includes determining the malware status of the process.

16. The system of claim 14, wherein:
   determining the entity associated with the attempt includes determining a source of a process attempting to access the task scheduler; and
   determining the malware status of the entity includes determining the malware status of the source.

17. The system of claim 14, wherein:
   determining the entity associated with the attempt includes determining a destination file to be launched as a result of the attempt to access the task scheduler; and
   determining the malware status of the entity includes determining the malware status of the destination file.

18. The system of claim 14, wherein:
   determining the entity associated with the attempt includes:
      determining two or more of a process attempting to access the task scheduler, a source of the process attempting to access the task scheduler, a destination file to be launched as a result of the attempt to access the task scheduler, and a network destination to be accessed as a result of the attempt to access the task scheduler; and
      determining a relationship between two or more of the process, the source, the destination file, and the network destination; and
   determining the malware status of the entity includes independently determining the malware status of two or more of the process, the source, the destination file, and the network destination.

* * * * *